(12) United States Patent
Cho

(10) Patent No.: US 6,172,715 B1
(45) Date of Patent: Jan. 9, 2001

(54) PICTURE-IN-PICTURE CONTROL METHOD AND APPARATUS FOR VIDEO TELEVISION SYSTEM

(75) Inventor: Young Soo Cho, Suwon (KR)

(73) Assignee: Samsung Electronics Co., Ltd., Kyungki-do (KR)

(*) Notice: Under 35 U.S.C. 154(b), the term of this patent shall be extended for 0 days.

(21) Appl. No.: 08/966,981

(22) Filed: Nov. 10, 1997

(30) Foreign Application Priority Data

Nov. 8, 1996 (KR) .................................................. 96-52979

(51) Int. Cl.⁷ .............................. H04N 5/445; H04N 5/45
(52) U.S. Cl. .................................. 348/565; 386/1; 386/46; 348/564; 348/731
(58) Field of Search ........................................ 348/565, 564, 348/563, 460, 731; 386/1, 46, 83

(56) References Cited

U.S. PATENT DOCUMENTS

| 4,845,564 | * | 7/1989 | Hakamada et al. | 358/183 |
| 4,949,179 | * | 8/1990 | Hosono | 358/183 |
| 5,285,284 | * | 2/1994 | Takashima et al. | 348/731 |
| 5,432,561 | * | 7/1995 | Strubbe | 348/565 |
| 5,852,704 | * | 12/1998 | Kim | 386/46 |

* cited by examiner

*Primary Examiner*—Chris S. Kelley
*Assistant Examiner*—Reuben M. Brown
(74) *Attorney, Agent, or Firm*—Sughrue, Mion, Zinn, Macpeak & Seas, PLLC

(57) ABSTRACT

A picture-in-picture (PIP) control method and apparatus for use in a video television system (TVCR) selectively controls the operation of a video cassette recorder (VCR) according to a PIP control signal. A TV broadcasting signal is displayed as a parent picture and a playback signal output from the VCR is displayed as a child picture. When the PIP control signal indicates that the VCR is to be turned off and a PIP display mode is to be turned off, only a parent picture is displayed and at the same time a playback operation of the VCR is stopped, thereby reducing a cumbersome manipulation of a key to control the VCR.

4 Claims, 2 Drawing Sheets

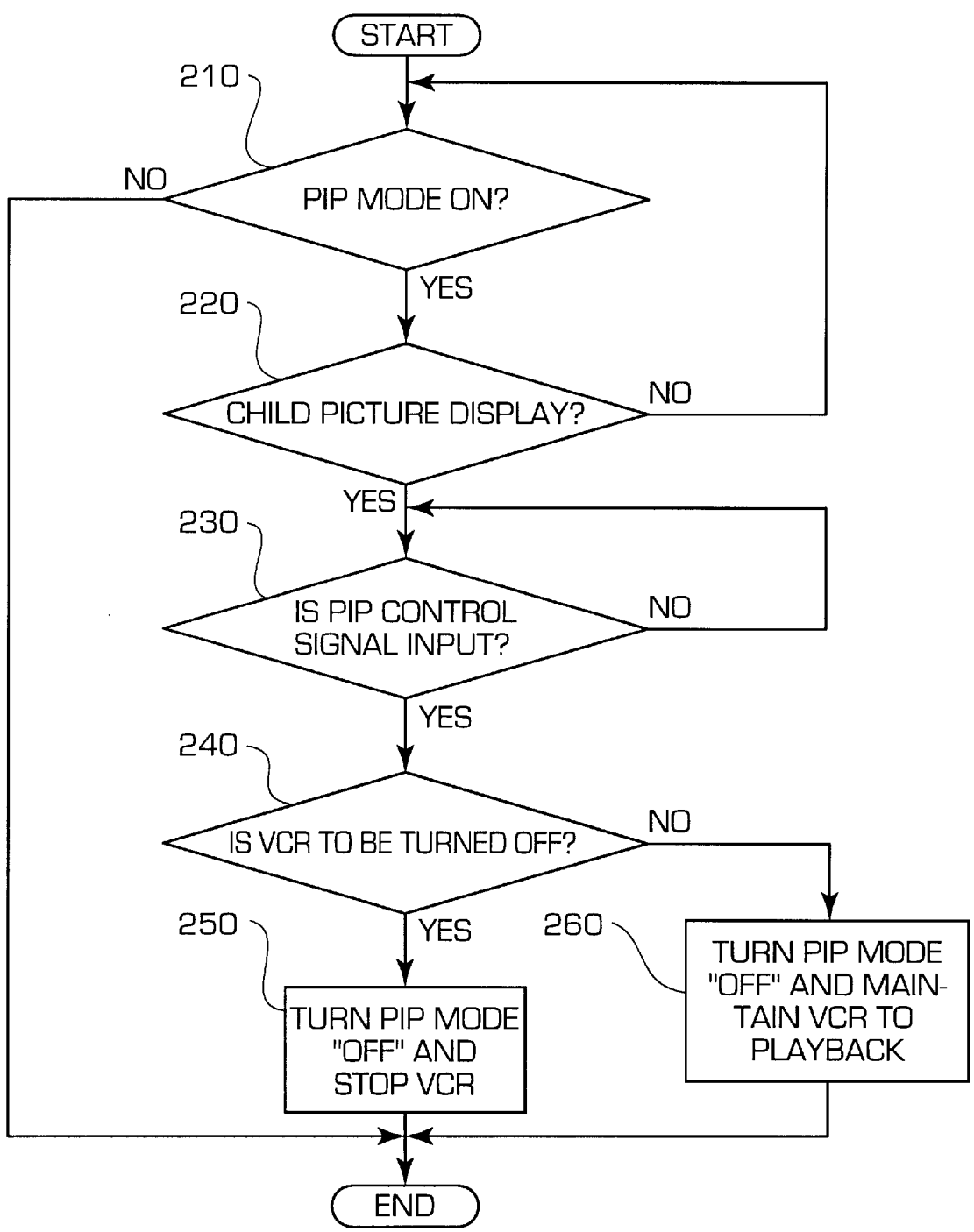

PICTURE-IN-PICTURE CONTROL METHOD AND APPARATUS FOR VIDEO TELEVISION SYSTEM

BACKGROUND OF THE INVENTION

1. Field of the Invention

The present invention relates to a picture-in-picture (PIP) control method and apparatus therefor, and more particularly, to a PIP control method and apparatus for a video television system (TVCR) which can selectively control an operation of a video cassette recorder (VCR) according to a PIP control. The present application is based upon Korean Application No. 96-52979, which is incorporated herein by reference.

2. Description of the Related Art

A general PIP system simultaneously displays a parent picture on an entire screen and a child picture, having a size smaller than that of the parent picture, on a predetermined position of the parent picture. Video equipment adopting such a PIP system includes at least two tuners. One tuner receives a TV broadcasting signal to be displayed as a parent picture, and the other tuner receives a TV broadcasting signal to be displayed as a child picture.

A general video television system (TVCR), which integrally incorporates a television set with a video cassette recorder (VCR), includes a single tuner and a VCR. Thus, when adopting the above described PIP system, the TVCR displays a TV broadcasting signal received via the tuner as a parent picture and a playback signal output from the VCR as a child picture. Alternatively, a playback signal output from the VCR is displayed as the parent picture and a TV broadcasting signal received via the tuner is displayed as the child picture.

In the TVCR having such a PIP function, when a TV broadcasting signal received via the tuner is displayed as a parent picture and a playback signal output from the VCR is displayed as a child picture, if the PIP mode is turned off, only the child picture disappears, and the VCR continues to operate. As a result, a separate key manipulation is required in order to stop a playback operation of the VCR, thereby causing an inconvenience to users.

SUMMARY OF THE INVENTION

To solve the above problems, it is an object of the present invention to provide a PIP control method which can stop or maintain a playback operation of a VCR in a video television system (TVCR) according to a PIP control signal.

Another object of the present invention is to provide a PIP control apparatus which can stop or maintain a playback operation of a VCR in a video television system (TVCR) according to a PIP control signal.

To accomplish the above object of the present invention, there is provided a picture-in-picture (PIP) control method for use in a video television system (TVCR). The PIP control method first determines whether a child picture is displayed by the TVCR system, and whether a PIP control signal is input to the TVCR system. The contents of the PIP control signal, when the PIP control signal is input, are then determined. The method then displays only a parent picture and at the same time stops a playback operation of a VCR when the contents of the PIP control signal indicate that the VCR is to be turned off, and displays only the parent picture when the contents of the PIP control signal indicate that a PIP display is to be turned off.

To accomplish another object of the present invention, there is also provided a picture-in-picture (PIP) control apparatus for use in a video television system (TVCR) which integrally incorporates functions of a TV and a VCR. The PIP control apparatus includes a key input unit, a controller, a switching unit, a parent picture video signal processor, a child picture video signal processor and a display.

The key input unit generates key input signals including a channel select signal, a video operating signal and a PIP control signal. The controller generates a function control signal according to the key input signals generated by the key input unit. The switching unit selects and outputs a TV broadcasting signal and a playback signal output from the VCR according to the function control signal of the controller. The parent picture video signal processor processes a video signal output from the switching unit into a video signal to be displayed as a parent picture. The child picture video signal processor processes a video signal output from the switching unit into a video signal to be displayed as a child picture. The display combines the child picture on a predetermined portion of the parent picture and displays the combination thereon. The controller controls the display to display only a parent picture and at the same time to stop a playback operation of the VCR when the PIP control signal received from the key input unit indicates that the VCR is to be turned off and a PIP display mode is to be turned off.

BRIEF DESCRIPTION OF THE DRAWINGS

The preferred embodiment is described with reference to the drawings wherein:

FIG. 2 is a flowchart for explaining the operation of FIG. 1 apparatus.

DETAILED DESCRIPTION OF THE PREFERRED EMBODIMENT

Figure 1:
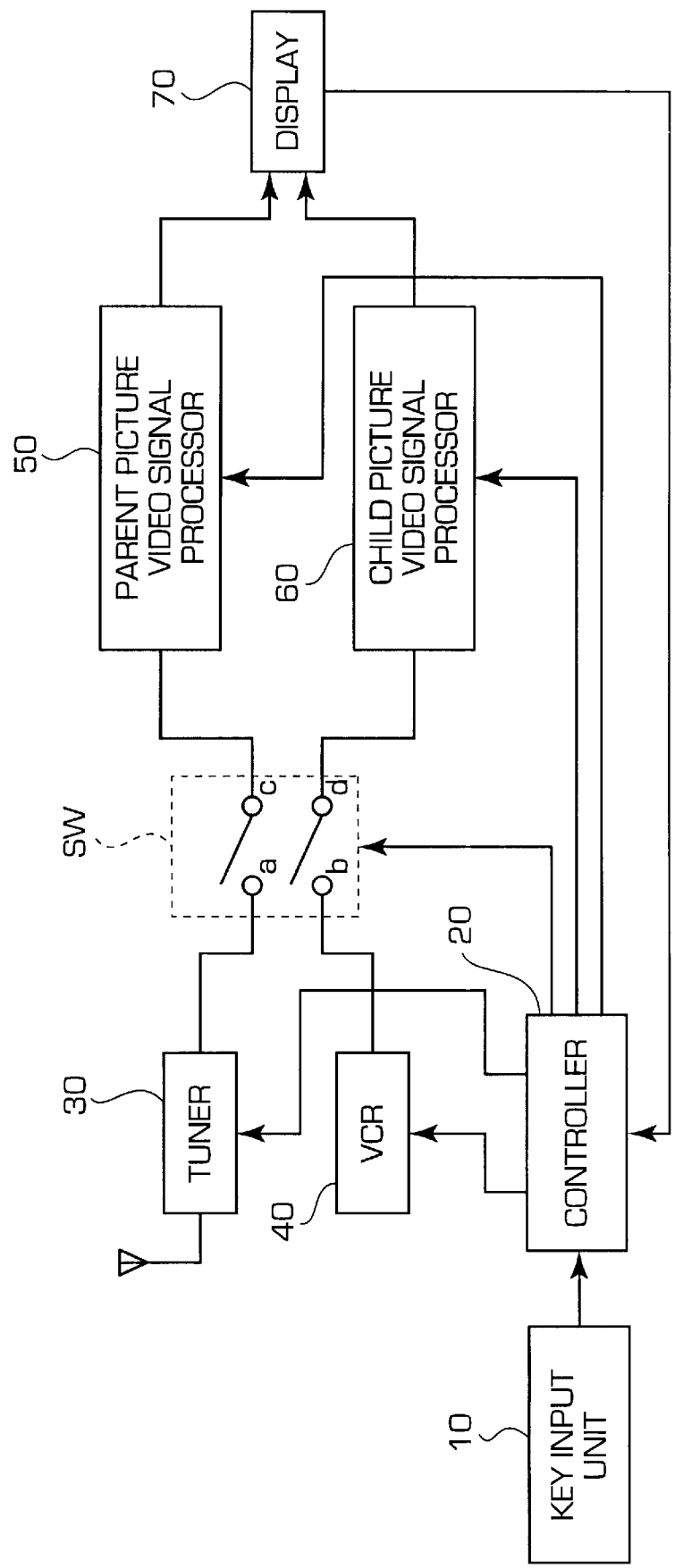
FIG. 1 is a TVCR according to a preferred embodiment of the present invention.

Referring to FIG. 1, a video television system (TVCR) of the present invention includes a key input unit 10 for generating a key input signal such as a PIP control signal, a channel select signal and a VCR control signal relating to the operations of a VCR such as playback, stop, etc. A controller 20 generates a number of operation control signals according to a key input signal via the key input unit 10. The controller 20 is connected to a tuner 30 and a VCR 40. The tuner 30 is controlled by the controller 20 to select a channel of a TV broadcasting signal. The VCR 40 performs or stops a playback operation under the control of the controller 20. A switching unit SW, connected to the tuner 30 and the VCR 40, selects a TV broadcasting signal supplied by the tuner 30 and a playback signal supplied by the VCR 40 according to a switching control signal of the controller 20, and outputs the selected result. The switching unit SW is connected to a parent picture video signal processor 50 and a child picture video signal processor 60. The parent picture video signal processor 50 processes an input video signal to be displayed as a parent picture, and a child picture video signal processor 60 processes an input video signal to be displayed as a child picture. The processed parent and child picture video signals are displayed on a display 70.

A case where a TV broadcasting signal is displayed as a parent picture and a playback signal output from the VCR is displayed as a child picture will first be described.

A user selects a desired broadcasting channel via the key input unit 10. A channel select signal according to the user's channel selection is input to the controller 20. The controller 20 controls the tuner 30 according to the input channel select signal, and the tuner 30 selects a channel of a TV broadcasting signal in accordance with the channel select signal. A TV broadcasting signal of the selected channel is supplied to the switching unit SW. Meanwhile, in order to display a playback signal output from the VCR as a child picture, the user inputs to the controller 20 via the key input unit 10 a VCR control signal for the playback operation of the VCR 40. The VCR 40 outputs a video signal recorded on a video tape (not shown) to the switching unit SW. The controller 20 generates a switch control signal so that the switching unit SW supplies the TV broadcasting signal output from the tuner 30 to the parent picture video signal processor 50 and the playback video signal output from the VCR 40 to the child picture video signal processor 60. The child picture video signal processor 60 compresses the video signal supplied by the VCR 40 via the switching unit SW by a predetermined size in the vertical and horizontal directions using a known technique for the display of a child picture. The parent picture video signal processor 50 processes the TV broadcasting signal applied from the tuner 30 via the switching unit SW so that the TV broadcasting signal is displayed as the parent picture on the display 70, and outputs the signal-processed result. The display 70 receives and displays both signals, so that the child picture is displayed on a predetermined portion of the parent picture.

FIG. 2 shows a flowchart for explaining the operation of the FIG. 1 apparatus. That is, when a child picture disappears from the screen of the display 70 under the state where a TV broadcasting signal is displayed as the parent picture of a TVCR and a playback signal output from the VCR is displayed as the child picture, the operation of the present invention will be described in more detail with reference to FIG. 2.

The controller 20 determines a current display state of the display 70. That is, the controller 20 determines whether a current state is a PIP mode "ON" state where a child picture exists on a predetermined portion of the parent picture (step 210). If the current state is a PIP mode "ON" state, the controller 20 determines whether a playback video signal output from the VCR 40 is displayed as the child picture (step 220). If the playback signal output from the VCR 40 is displayed, the controller 20 determines that the display is in a normal PIP mode operation state. Otherwise, the program is returned to step 210 to then repeat the procedure.

In step 230, the controller 20 determines whether a PIP control signal is input from the key input unit 10. If a PIP control signal is not input, the program is returned to step 230 to then repeat the step. However, when a PIP control signal is input, the controller 20 determines whether the PIP control signal applied from the key input unit 10 indicates that the VCR 40 is to be turned off (step 240). If the PIP control signal indicates that the VCR 40 is to be turned off, the controller 20 outputs a VCR stop signal to the VCR 40 to stop the playback operation (step 250), and controls the display 70 in order to release the PIP mode from an "ON" state. However, if the PIP control signal indicates that the VCR 40 is not to be turned off, the controller 20 controls only the display 70 so that only the parent is displayed via the display 70 in step 260.

As described above, the present invention relates to a picture-in-picture (PIP) control for a TVCR in the state where a playback signal output from the VCR is displayed as a child picture. When the PIP control signal indicates that the VCR is to be turned off and a PIP display mode is to be turned off, only a parent picture is displayed and at the same time a playback operation of the VCR is stopped.

Accordingly, an operation of the VCR is controlled through a child picture display control to thereby reduce a cumbersome manipulation of a key to control the VCR.

While only a certain embodiment of the invention has been specifically described herein, it will be apparent that numerous modifications may be made thereto without departing from the spirit and scope of the invention.

What is claimed is:

1. A picture-in-picture (PIP) control method for use in a video television (TVCR) system, the PIP control method comprising:
   (a) determining whether a child picture is displayed by said TVCR system;
   (b) determining whether a PIP control signal is input to said TVCR system;
   (c) determining contents of said PIP control signal when said PIP control signal is input in said step b);
   (d) controlling said TVCR system to display only a parent picture, stop display of a child picture and concurrently stop a playback operation of a VCR, while said VCR remains powered, when the contents of said PIP control signal indicate that said VCR is to be turned off and a PIP display is to be turned off; and
   (e) controlling said TVCR system to display only said parent picture and stop display of said child picture when the contents of said PIP control signal indicate that said PIP display is to be turned off.

2. A picture-in-picture (PIP) control apparatus for use in a video television (TVCR) system which integrally incorporates functions of a TV and a VCR, the PIP control apparatus comprising:
   a key input unit for generating key input signals including a channel select signal, a video operating signal and a PIP control signal;
   a controller for generating a function control signal according to said key input signals generated by said key input unit;
   a switching unit for selecting and outputting a TV broadcasting signal and a playback signal output from said VCR according to said function control signal of said controller;
   a parent picture video signal processor for processing a video signal output from said switching unit into a parent video signal to be displayed as a parent picture;
   a child picture video signal processor for processing a video signal output from said switching unit into a child video signal to be displayed as a child picture; and
   a display for displaying only said parent picture, or a PIP display combination of said child picture and said parent picture, wherein said child picture is displayed on a predetermined portion of said parent picture when said PIP display combination is displayed;
   wherein said controller is operable to control said display to display only said parent picture, stop display of said child picture and concurrently stop a playback operation of said VCR, while said VCR remains powered, when said PIP control signal received from said key input unit indicates that said VCR is to be turned off and a PIP display mode is to be turned off.

3. A picture-in-picture (PIP) control method for use in a video television (TVCR) system, the PIP control method comprising:
   (a) determining whether a child picture is displayed by said TVCR system;
   (b) determining whether a PIP control signal is input to said TVCR system;

(c) determining contents of said PIP control signal when said PIP control signal is input in said step b); and (d) controlling said TVCR system to display only a parent picture, stop display of a child picture and concurrently stop a playback operation of a VCR, while said VCR remains powered, when the contents of said PIP control signal indicate that said VCR is to be turned off and a PIP display is to be turned off.

4. The PIP control method as claimed in claim 3, the PIP control method further comprising:

controlling said TVCR system to display only said parent picture and stop display of a child picture when the contents of said PIP control signal indicate that a PIP display is to be turned off.

* * * * *